United States Patent
Wang et al.

(10) Patent No.: US 11,828,196 B2
(45) Date of Patent: Nov. 28, 2023

(54) GAS TURBINE ENGINE ARTICLE WITH SERPENTINE GROOVE FOR COATING INTERLOCK

(71) Applicant: RAYTHEON TECHNOLOGIES CORPORATION, Farmington, CT (US)

(72) Inventors: Zhigang Wang, South Windsor, CT (US); Tahany El-Wardany, Vernon, CT (US); Xia Tang, West Hartford, CT (US); Gajawalli V. Srinivasan, South Windsor, CT (US); Anthony G. Ruglio, Rocky Hill, CT (US); Xiaomei Fang, South Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 249 days.

(21) Appl. No.: 17/587,246

(22) Filed: Jan. 28, 2022

(65) Prior Publication Data

US 2023/0243269 A1 Aug. 3, 2023

(51) Int. Cl.
*F01D 5/28* (2006.01)
*F01D 25/24* (2006.01)

(52) U.S. Cl.
CPC ............. *F01D 5/288* (2013.01); *F01D 25/24* (2013.01); *F05D 2250/184* (2013.01); *F05D 2250/185* (2013.01); *F05D 2300/611* (2013.01)

(58) Field of Classification Search
CPC .... F01D 5/288; F01D 25/24; F05D 2250/184; F05D 2250/185; F05D 2300/611
See application file for complete search history.

(56) References Cited

U.S. PATENT DOCUMENTS

| | | | | |
|---|---|---|---|---|
| 9,884,393 | B2* | 2/2018 | Roberts | .................... B22F 5/009 |
| 11,174,749 | B2* | 11/2021 | Le Biez | .................... B22F 7/06 |
| 2013/0017072 | A1* | 1/2013 | Ali | ........................ F01D 11/122 |
| | | | | 415/174.4 |
| 2017/0051614 | A1* | 2/2017 | Merrill, Jr. | .............. F01D 5/288 |

FOREIGN PATENT DOCUMENTS

| CN | 103266295 | 8/2013 |
|---|---|---|
| CN | 109913801 | 6/2019 |
| CN | 110666356 | 1/2020 |
| CN | 113652687 | 11/2021 |

OTHER PUBLICATIONS

Kromer, R., Costil, S., Cormier, J., Berthe, L., Peyre, P., and Courapied, D. (2015). Laser patterning pretreatment before thermal spraying: a technique to adapt and control the surface topography to thermomechanical loading and materials. Journal of Thermal Spray Technology. vol. 25(3). Feb. 2016. pp. 401-410.

(Continued)

*Primary Examiner* — Igor Kershteyn
(74) *Attorney, Agent, or Firm* — Carlson, Gaskey & Olds, P.C.

(57) ABSTRACT

A gas turbine engine article includes a substrate that has a pre-bond surface that includes a serpentine groove. A coating is disposed on the pre-bond surface and mechanically interlocks with the serpentine groove.

20 Claims, 3 Drawing Sheets

(56) References Cited

OTHER PUBLICATIONS

Luo, L., Zhang, X., Zou, Z.., Guo, F., Qi, X., and Xiao, P. (2016). Improved the durability of thermal barrier coatings with interface modified by three-dimensional mesh patterns. J. Am. Ceram. Soc. vol. 99 (10). 2016. pp. 3406-3410.

Kim, W-S., Yun, I-H., Lee, J-J., and Jung, H-T. (2010). Evaluation of mechanical interlock effect on adhesion strength of polymer-metal interfaces using micro-patterned surface topography. International Journal of Adhesion & Adhesives. vol. 30. 2010. pp. 408-417.

Kromer, R., Costil, S., Cormier, J., Courapied, D. Berthe, L. Peyre, P. and Boustie, M. (2015). Laser surface patterning to enhance adhesion of plasma sprayed coatings. Surface and Coatings Technology. vol. 278. Sep. 25, 2015. pp. 171-182.

Packham, D.E. (2003). Surface energy, surface topography and adhesion. International Journal of Adhesion & Adhesives. vol. 23. 2003. pp. 437-448.

Cassie, A.B.D., and Baxter, S. (1944). Wettability of porous surfaces. Transactions of the Faraday Society. vol. 40. 1944. pp. 546-551.

\* cited by examiner

GAS TURBINE ENGINE ARTICLE WITH SERPENTINE GROOVE FOR COATING INTERLOCK

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature exhaust gas flow. The high-pressure and temperature exhaust gas flow expands through the turbine section to drive the compressor and the fan section. The compressor section may include low and high pressure compressors, and the turbine section may also include low and high pressure turbines.

Airfoils, seals, combustor panels, and other components in the engine may be formed of a superalloy or a ceramic and may include barrier coatings to extend capability and lifetime. A bond coat may be used between the component substrate and the barrier coating. Prior to depositing the bond coat, the surface of the component substrate may be pre-treated in order to enhance bonding. One process for such pre-treatment includes grit-blasting. The grit-blasting cleans and roughens the surface so that the coating can mechanically bond to the surface.

SUMMARY

A gas turbine engine article according to an example of the present disclosure includes a substrate having a pre-bond surface with a serpentine groove, and a coating disposed on the surface and mechanically interlocking with the serpentine groove.

In a further embodiment of any of the foregoing embodiments, the serpentine groove is of continuous length from a first groove end to a second groove end.

In a further embodiment of any of the foregoing embodiments, the serpentine groove includes a plurality of bends of at least 180 degrees.

In a further embodiment of any of the foregoing embodiments, the plurality of bends has at least 20 bends.

In a further embodiment of any of the foregoing embodiments, the serpentine groove is of uniform width over the continuous length.

In a further embodiment of any of the foregoing embodiments, the serpentine groove is of uniform depth over the continuous length.

In a further embodiment of any of the foregoing embodiments, a ratio of the uniform depth to the uniform width is 2:1 or less.

In a further embodiment of any of the foregoing embodiments, the serpentine groove defines coils, and the coils are uniformly spaced apart by a pitch distance.

In a further embodiment of any of the foregoing embodiments, the pitch distance is substantially equal to the uniform width.

In a further embodiment of any of the foregoing embodiments, the uniform width is from 10 micrometers to 200 micrometers.

In a further embodiment of any of the foregoing embodiments, the uniform width is from 20 micrometers to 100 micrometers.

In a further embodiment of any of the foregoing embodiments, the serpentine groove has a groove floor, and the groove floor includes dimples that are spaced apart from each other along the continuous length.

In a further embodiment of any of the foregoing embodiments, the serpentine groove has a sine wave profile.

In a further embodiment of any of the foregoing embodiments, the coating includes an intermetallic layer and a ceramic layer.

In a further embodiment of any of the foregoing embodiments, the pre-bond surface has a Young's contact angle $\theta Y$ of approximately 60° and a fraction of the pre-bond surface wetted versus unwetted is at least 0.7.

A gas turbine engine according to an example of the present disclosure includes a compressor section, a combustor in fluid communication with the compressor section, and a turbine section in fluid communication with the combustor. The turbine section includes articles that each include a substrate having a pre-bond surface having a serpentine groove, and a coating disposed on the pre-bond surface and mechanically interlocking with the serpentine groove.

In a further embodiment of any of the foregoing embodiments, the serpentine groove is of continuous length from a first groove end to a second groove end, the serpentine groove includes a plurality of bends of at least 180 degrees, and the plurality of bends has at least 20 bends.

In a further embodiment of any of the foregoing embodiments, the serpentine groove is of uniform width and of uniform depth over the continuous length, and a ratio of the uniform depth to the uniform width is 2:1 or less.

In a further embodiment of any of the foregoing embodiments, the serpentine groove defines coils, the coils are uniformly spaced apart by a pitch distance, and the pitch distance is substantially equal to the uniform width.

In a further embodiment of any of the foregoing embodiments, the serpentine groove has a groove floor, and the groove floor includes dimples that are spaced apart from each other along the continuous length.

In a further embodiment of any of the foregoing embodiments, the serpentine groove has a sine wave profile.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
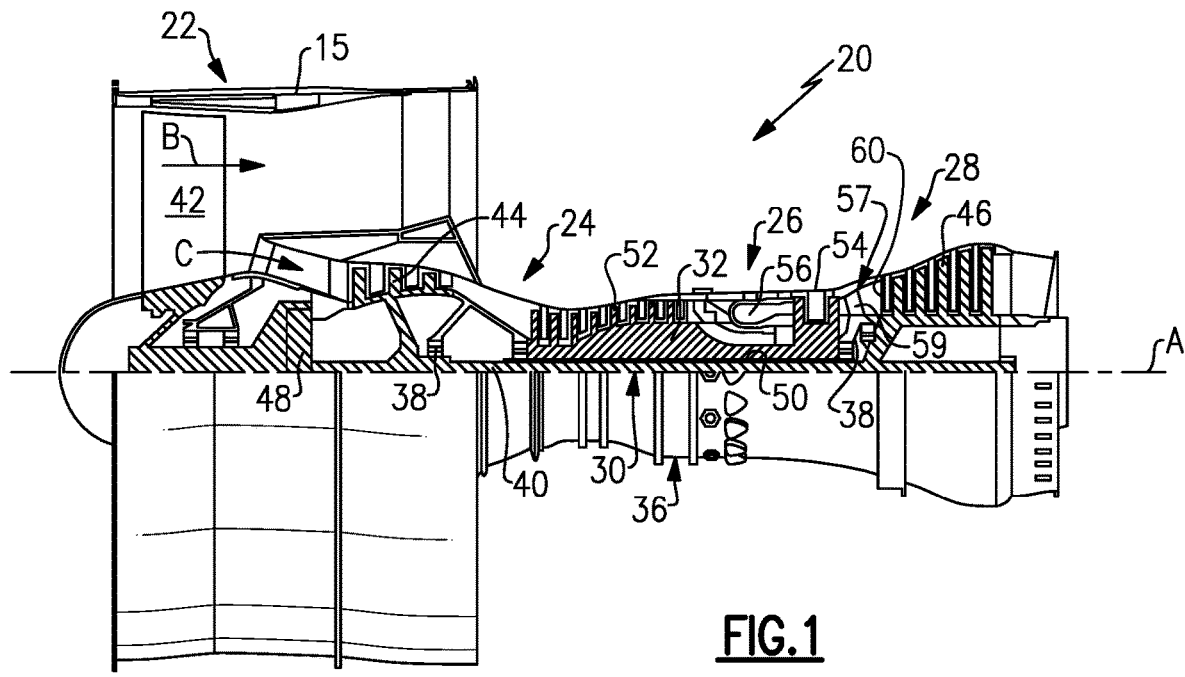
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"-is the industry standard parameter of 1 bm of fuel being burned divided by 1 bf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
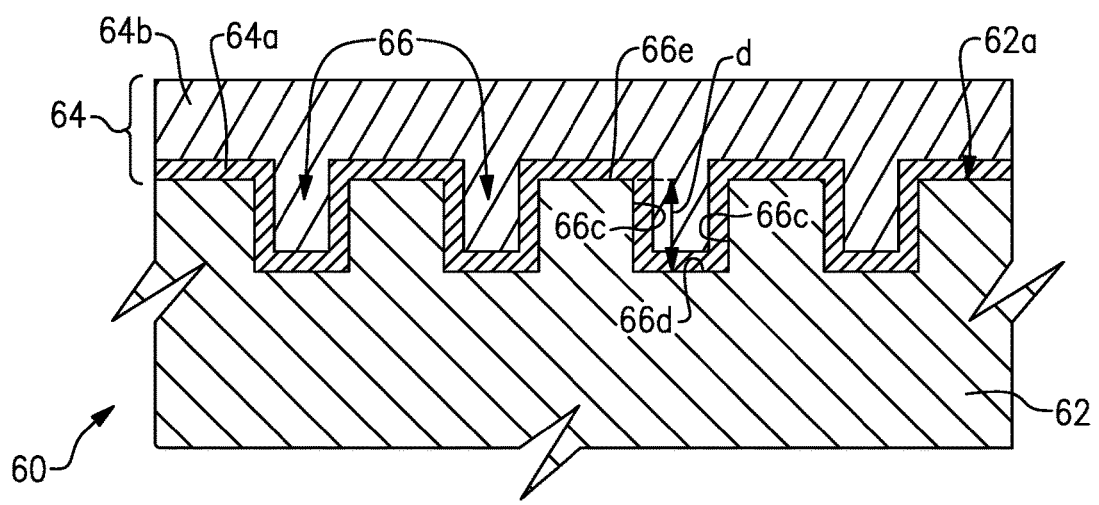
FIG. 2 illustrates a representative portion of an article of the engine.

FIG. 2 illustrates a representative portion of an article 60 from the engine 20. As an example, the article 60 may be, but is not limited to, a turbine blade, a turbine vane, a blade outer air seal, a combustor panel, or other article that is exposed to the high temperature combustion gases in the engine 20.

The article 60 includes a substrate 62 that has a pre-bond surface 62a that may face towards the core flowpath C of the engine 20. The substrate 62 is not particularly limited and may be, but is not limited to, a superalloy (e.g., a nickel- or cobalt-based alloy) or a ceramic material (e.g., a ceramic matrix composite or a monolithic ceramic). There is a coating 64 disposed on the surface 62a, to enhance resistance to the high temperatures, resistance to environmental substances, or both. In this example, the coating 64 is a multi-layer coating that includes a bond coat layer 64a and ceramic layer 64b. In one example, the bond coat layer 64a is an intermetallic. For instance, the intermetallic may be MCrAlY, where the M includes at least one of nickel, cobalt, iron, or combinations thereof. In other examples, the bond coat layer 64a may be silica or combinations of silica with refractory phases. The ceramic layer 64b may include yttria stabilized with zirconia, hafnia, and/or gadolinia, gadolinia zirconate, molybdate, alumina, hafnia, silica, barium-magnesium-aluminosilicate, hafnium silicate, zirconium silicate, rare earth silicate, rare earth oxides, mullite, or combinations thereof.

The surface 62a has a serpentine groove 66, and the coating 64 is mechanically interlocked with the serpentine groove 66. As will be discussed below, the serpentine groove 66 is configured to enhance wetting during coating deposition, which in turn enhances bonding between the coating 64 and substrate 62.

Figure 3:
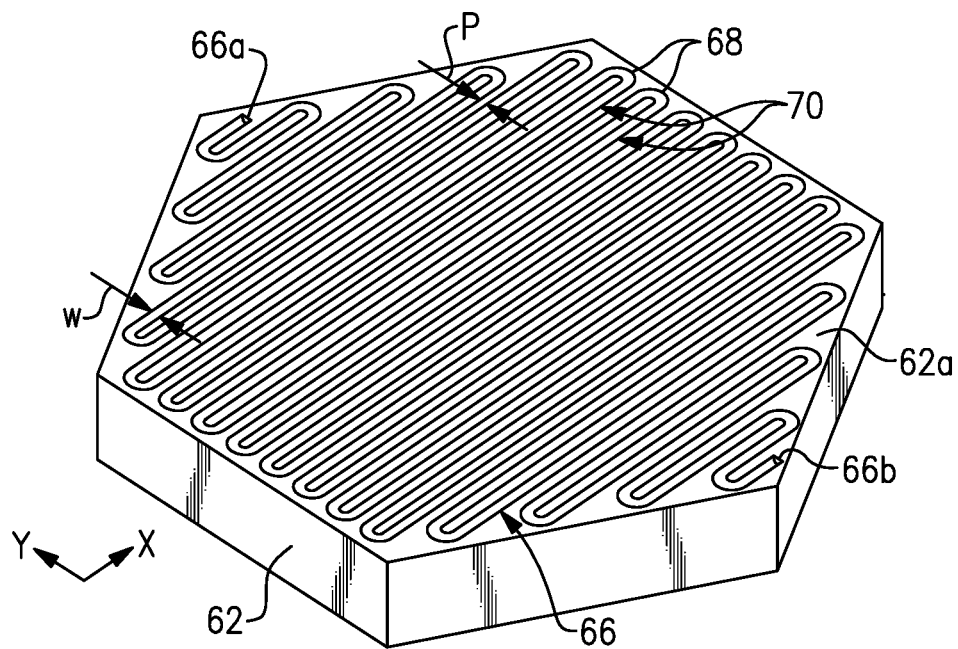
FIG. 3 illustrates a substrate of the article, without the coating.

FIG. 3 illustrates a representative portion of the substrate 62 but without the coating 64 so that the serpentine groove 66 is visible. The serpentine groove 66 starts at a first groove end 66a and extends continuously to a second groove end 66b. The serpentine groove 66 is continuous in that it is uninterrupted between the ends 66a/66b. The continuity facilitates manufacturing because the tool or laser that is used to create the groove 66 need not be raised or switch on/off as it traverses the surface 62a to form the groove 66.

The serpentine groove 66 is also of uniform width (w) and of uniform depth (d; see FIG. 2) over the continuous length. The width (w) is the linear distance between side walls 66c (FIG. 2) of the serpentine groove 66, and the depth (d) is the linear distance from the floor 66d of the serpentine groove 66 to top surface 66e. The groove 66 has a ratio of the depth to the width that is 2:1 or less. In one example, the width is from 10 micrometers to 200 micrometers. In a further example, the width is from 20 micrometers to 100 micrometers.

The serpentine groove 66 winds back-and-forth across the surface 62a of the substrate 62 and includes a plurality of bends 68 of at least 180 degrees. The bends 68 define coils 70, which are uniformly spaced-apart by a pitch distance (p). The pitch distance is substantially equal to the uniform width of the groove 66. As used herein, "substantially equal" means equal within a tolerance of +/−5%. In general, the serpentine groove 66 extends across a substantial portion of the surface 62a of the substrate 62. In that regard, the pattern defined by the serpentine groove 66 may have at least 20 bends.

The serpentine groove 66 provides enhanced bond strength between the coating 64 and the substrate 62. For example, in comparison to a grit-blasted surface, the serpentine groove 66 may increase bond strength by a factor of approximately 2× and may increase spallation resistance by a factor of approximately 3×.

Figure 4:
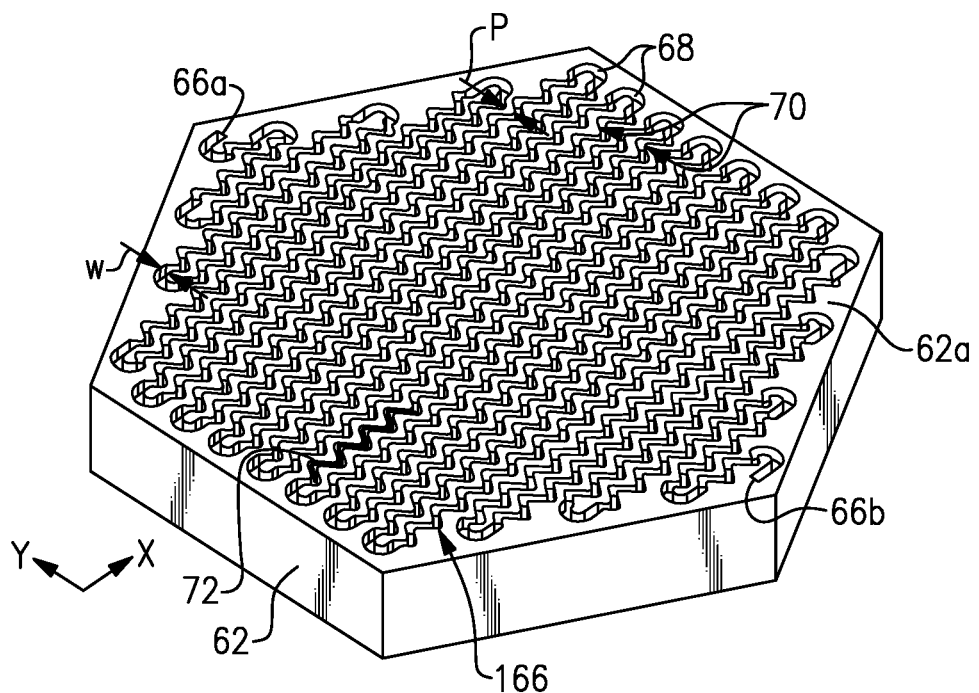
FIG. 4 illustrates another example of a substrate that has a serpentine groove with a sine wave profile.

FIG. 4 illustrates another example serpentine groove 166. The serpentine groove 166 is the same as the serpentine groove 66 except that it has a sine wave profile 72 to further facilitate mechanical interlocking with the coating 64. Additionally, the sine wave profile 72 facilitates isotropy in the wetting of the coating 64 during deposition and thus also in the properties of the final coating 64. For instance, the coils 70 in the serpentine groove 66 in the example of FIG. 2 extend straight in the x-direction, thus inducing an anisotropy associated with that direction. The sine wave profile 72 in the serpentine groove 166, however, provides component directionalities in both the x- and y-directions, thereby inducing a greater isotropy in comparison to the serpentine groove 66.

Figure 5:
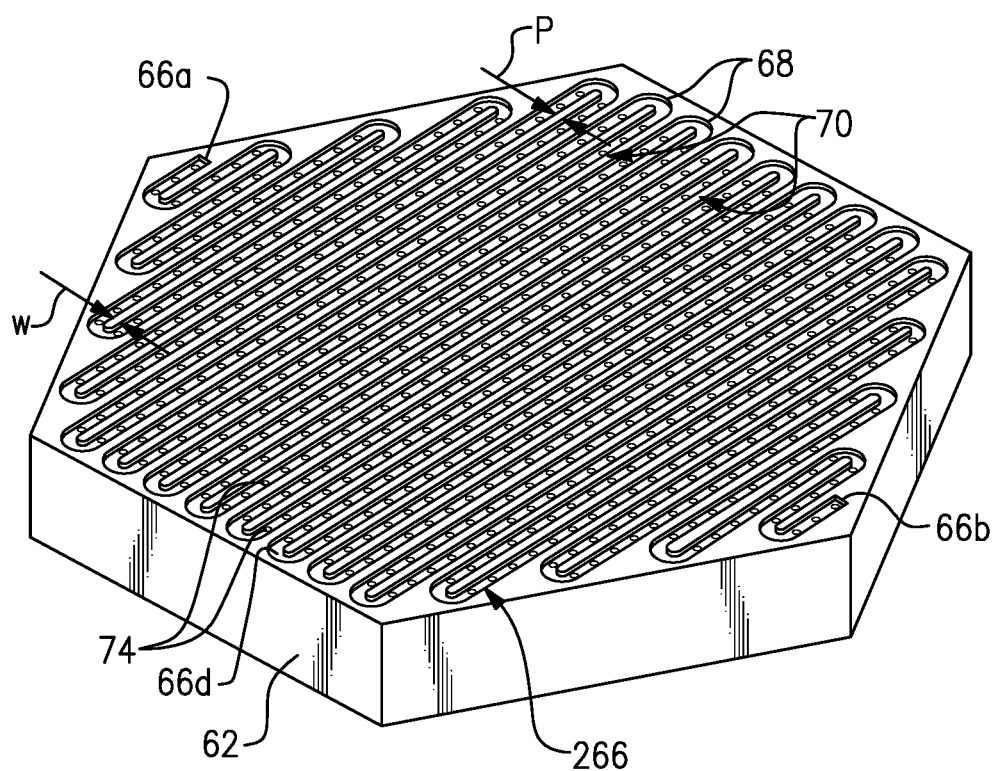
FIG. 5 illustrates another example of a substrate that has a serpentine groove with dimples.

FIG. 5 illustrates another example serpentine groove 266. The serpentine groove 266 is the same as the serpentine groove 66 except that the groove floor 66d has dimples 74 that are uniformly spaced apart from each other along the continuous length of the groove 266. For example, the dimples 74 are arranged serially along the groove floor 66d in a repeated spacing or pattern of spacing. The dimples 74 provide additional surface area to further facilitate mechanical interlocking with the coating 64. It is to be appreciated that a further example includes a combination of the sine wave profile 72 and the dimples 74.

This character of the serpentine grooves disclosed herein is based on a physical model for dominant geometrical parameters to guide texture design for enhanced coating adherence and durability. From a thermodynamic standpoint, adhesion of a bi-material bond is the amount of energy required to create free surfaces by separating the interface. In the thermal equilibrium condition, the interface free energy $\gamma_i$ between a coating particle and a solid substrate is given by the Young equation:

$$\gamma_i = \gamma_s + \gamma_p \cos\theta \quad (1)$$

where $\gamma_s$ and $\gamma_p$ are the surface free energies of the substrate and particle, respectively, and $\theta$ is the contact angle of a coating particle droplet on the substrate surface. According to the Young—Dupre equation, the adhesion energy between the coating particle droplet and substrate is calculated as follows:

$$Wa = \gamma_s + \gamma_p - \gamma_i = \gamma_p(1+\cos\theta) \quad (2)$$

Therefore, using the surface free energy of the coating and the measured contact angle between the coating particle droplet and the substrate, the adhesion energy of the coating/substrate bond can be calculated. The surface free energy, $\gamma$, refers to the energy required to create new surfaces of the material is assumed to be in ambient air condition.

The interface between two surfaces has a specific energy, called the interfacial energy, which is proportionate to interfacial area. To characterize the contact surface properties, the roughness factor, r, is defined:

$$r = A/A_0 \quad (3)$$

where A is the "true" surface area, $A_0$ the nominal area, i.e., the area of a plane surface.

In practice, air can be trapped on the rough surface under the liquid. The Cassie—Baxter equation for the apparent contact angle with Cassie—Baxter formula, OCB, is:

$$\cos\theta_{CB} = rf_1 \cos\theta_0 - f_2 = f_1(r\cos\theta_Y + 1) - 1 \quad (4)$$

where $f_1$ and $f_2$ are area fractions for the wetted and unwetted surfaces, respectively, and $\theta_Y$ is Young's contact angle of the untreated surface.

In the Cassie-Baxter wetting state, the role of Young's contact angle is investigated by plotting Eq. (4) with Oy as a parameter. The difference between the apparent contact angle values of the hydrophobic ($\theta_Y=90°$) surface and hydrophilic ($\theta_Y=0°$) surface decreases as f decreases. This indicates that the contribution of the surface chemistry ($\theta_Y$) of a material on the liquid repellency ($\theta^*$) diminishes as $f_1$ gets smaller. In other words, regardless of how much surface area is increased, the top surface would always be hydrophobic. Therefore, the surface texture, as in the disclosed serpentine grooves, is designed to maintain the certain liquid-solid contact. Also, the increased surface roughness factor facilitates a texture that is hydrophilic. Therefore, for most machined surfaces with $\theta_Y$ of ~60°, as long as $f_1$ is maintained above 0.7, it is feasible to obtain a hydrophilic surface texture, and larger surface roughness factors are preferable.

After surface texturing, the fine features (or air pockets) are present on the surfaces. When water-based coating or hydrophilic coating is spread over the surface to form the coating 64, the liquid-solid contact area mainly depends on how much air is removed from the cavities on the surfaces in addition to the chemical interaction between coating and substrate surface. If the removal of air is lower than a certain level, the bond strength will be reduced accordingly. So, it is necessary to have good wettability on the surface to allow the coating material to penetrate into the serpentine groove 66/166/266 to enhance the bond strength through mechanical interlock. Thus, to maintain certain level of liquid-solid contact and ensure a satisfactory level of bond strength, texture geometries of the serpentine grooves are defined to ensure the removal of air from the cavities on the surfaces.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A gas turbine engine article comprising:
   a substrate including a pre-bond surface having a serpentine groove, the serpentine groove being of continuous length from a first groove end to a second groove end, the serpentine groove having a groove floor, and the groove floor includes dimples that are spaced apart from each other along the continuous length; and
   a coating disposed on the surface and mechanically interlocking with the serpentine groove.

2. The gas turbine engine article as recited in claim 1, wherein the serpentine groove is of continuous length from a first groove end to a second groove end.

3. The gas turbine engine article as recited in claim 2, wherein the serpentine groove includes a plurality of bends of at least 180 degrees.

4. The gas turbine engine article as recited in claim 3, wherein the plurality of bends has at least 20 bends.

5. The gas turbine engine article as recited in claim 2, wherein the serpentine groove is of uniform width over the continuous length.

6. The gas turbine engine article as recited in claim 5, wherein the serpentine groove is of uniform depth over the continuous length.

7. The gas turbine engine article as recited in claim 6, wherein a ratio of the uniform depth to the uniform width is 2:1 or less.

8. The gas turbine engine article as recited in claim 5, wherein the serpentine groove defines coils, and the coils are uniformly spaced apart by a pitch distance.

9. The gas turbine engine article as recited in claim 8, wherein the pitch distance is substantially equal to the uniform width.

10. The gas turbine engine article as recited in claim 5, wherein the uniform width is from 10 micrometers to 200 micrometers.

11. The gas turbine engine article as recited in claim 5, wherein the uniform width is from 20 micrometers to 100 micrometers.

12. The gas turbine engine article as recited in claim 1, wherein the serpentine groove has a sine wave profile.

13. The gas turbine engine article as recited in claim 1, wherein the coating includes an intermetallic layer and a ceramic layer.

14. The gas turbine engine article as recited in claim 1, where the pre-bond surface has a Young's contact angle $\theta_Y$ of approximately 60° and a fraction of the pre-bond surface wetted versus unwetted is at least 0.7.

15. A gas turbine engine comprising:
    a compressor section;
    a combustor in fluid communication with the compressor section; and
    a turbine section in fluid communication with the combustor, the turbine section including articles that each comprise:
       a substrate including a pre-bond surface having a serpentine groove, the serpentine groove having a sine wave profile, and
       a coating disposed on the pre-bond surface and mechanically interlocking with the serpentine groove.

16. The gas turbine engine as recited in claim 15, wherein the serpentine groove is of continuous length from a first groove end to a second groove end, the serpentine groove includes a plurality of bends of at least 180 degrees, and the plurality of bends has at least 20 bends.

17. The gas turbine engine as recited in claim 16, wherein the serpentine groove is of uniform width and of uniform depth over the continuous length, and a ratio of the uniform depth to the uniform width is 2:1 or less.

18. The gas turbine engine as recited in claim 17, wherein the serpentine groove defines coils, the coils are uniformly spaced apart by a pitch distance, and the pitch distance is substantially equal to the uniform width.

19. The gas turbine engine as recited in claim 15, wherein the serpentine groove has a groove floor, and the groove floor includes dimples that are spaced apart from each other along the continuous length.

20. A gas turbine engine article comprising:
    a substrate including a pre-bond surface having a serpentine groove, the pre-bond surface having a Young's contact angle $\theta_Y$ of approximately 60° and a fraction of the pre-bond surface wetted versus unwetted is at least 0.7; and
    a coating disposed on the surface and mechanically interlocking with the serpentine groove.

* * * * *